United States Patent

(12) United States Patent
Shibuya et al.

(10) Patent No.: US 11,868,088 B2
(45) Date of Patent: Jan. 9, 2024

US011868088B2

(54) TIMEPIECE COMPONENT, TIMEPIECE MOVEMENT, AND TIMEPIECE

(71) Applicant: Seiko Epson Corporation, Tokyo (JP)

(72) Inventors: Munehiro Shibuya, Minamiminowa (JP); Takeo Funakawa, Chino (JP)

(73) Assignee: SEIKO EPSON CORPORATION

( * ) Notice: Subject to any disclaimer, the term of this patent is extended or adjusted under 35 U.S.C. 154(b) by 1398 days.

(21) Appl. No.: 16/130,179

(22) Filed: Sep. 13, 2018

(65) Prior Publication Data

US 2019/0076876 A1 Mar. 14, 2019

(30) Foreign Application Priority Data

Sep. 14, 2017 (JP) ................................ 2017-177064

(51) Int. Cl.

| | |
|---|---|
| ***G04B 15/14*** | (2006.01) |
| ***G04B 13/02*** | (2006.01) |
| ***B05D 5/08*** | (2006.01) |

(52) U.S. Cl.

CPC ........... *G04B 13/022* (2013.01); *B05D 5/083* (2013.01); *G04B 15/14* (2013.01); *B05D 2203/30* (2013.01)

(58) Field of Classification Search

None

See application file for complete search history.

(56) References Cited

U.S. PATENT DOCUMENTS

| | | | | |
|---|---|---|---|---|
| 5,425,989 | A | 6/1995 | Ogawa et al. | |
| 2010/0231631 | A1* | 9/2010 | Hosaka | B41M 5/0023 347/15 |
| 2013/0176829 | A1 | 7/2013 | Cusin et al. | |
| 2014/0288231 | A1* | 9/2014 | Fujita | C08F 216/1408 524/544 |
| 2016/0077491 | A1 | 3/2016 | Tanabe et al. | |
| 2017/0205538 | A1* | 7/2017 | Furusato | G04C 3/14 |

FOREIGN PATENT DOCUMENTS

| | | | |
|---|---|---|---|
| CN | 103097965 | A | 5/2013 |
| CN | 105425570 | A | 3/2016 |
| EP | 2 749 582 | A1 | 7/2014 |
| JP | 57098599 | A * | 6/1982 |
| JP | S57-098599 | A | 6/1982 |
| JP | 06-134916 | A | 5/1994 |
| JP | 2007-023356 | A | 2/2007 |
| JP | 2012-167808 | A | 9/2012 |
| JP | 2015-152499 | A | 8/2015 |
| JP | 2017-128494 | A | 7/2017 |

OTHER PUBLICATIONS

JP57-098599withabstractENGMACHTRANS (1982).*

Extended European Search Report for Application No. EP 18 19 4232 dated Feb. 28, 2019 (7 pages).

* cited by examiner

*Primary Examiner* — Kenneth J Stachel

(74) *Attorney, Agent, or Firm* — Harness, Dickey & Pierce, P.L.C.

(57) ABSTRACT

An escape wheel (an example of a timepiece component) has a silicon-made substrate having an insertion portion into which an axle is inserted, and a coating film formed in a contact portion which comes into contact with at least the axle, at a surface of the substrate. The coating film contains metal alkoxide having a fluorine atom.

5 Claims, 10 Drawing Sheets

TIMEPIECE COMPONENT, TIMEPIECE MOVEMENT, AND TIMEPIECE

BACKGROUND

1. Technical Field

The present invention relates to a timepiece component, a timepiece movement, and a timepiece.

2. Related Art

A mechanical timepiece is equipped with many timepiece components represented by wheels. The timepiece component such as the wheel is configured as follows. An axle is inserted into and fixed to (held by) a through-hole (holder) disposed at a center of a rotation member whose outer periphery has a plurality of teeth. In the related art, the timepiece component is formed by machining a metal material. However, in recent years, as a material of the timepiece component, a base material containing silicon has been used. The timepiece component using the silicon as the base material is lighter than a component using metal as the base material. Accordingly, an inertia force of the timepiece component can be reduced. Therefore, improved energy transfer efficiency is expected. In addition, the silicon allows the timepiece component to be more freely shaped when formed using photolithography or etching techniques. Therefore, there is an advantage in that processing accuracy of the timepiece component can be improved by using the silicon as the base material.

JP-A-2012-167808 discloses a timepiece component (third wheel & pinion) which has a rotation member (third wheel) using the silicon as the base material. Brittle fracture is likely to occur in the silicon, compared to the metal. Accordingly, when the axle (third pinion) is fitted into the through-hole of the rotation member, if stress applied to the rotation member is strong, the rotation member may be damaged in some cases. Therefore, the timepiece component disclosed in JP-A-2012-167808 has the following structure. In order to relax the stress caused when the rotation member and the axle are fitted together, a stress relaxation layer formed of the metal such as nickel is disposed on an inner peripheral surface of the through-hole of the rotation member, and is brought into contact with an outer peripheral surface of the axle.

However, according to the timepiece component disclosed in JP-A-2012-167808, the stress relaxation layer is configured to include a metal film. Thus, the stress relaxation layer needs to have a thickness to some degree, thereby correspondingly increasing a weight of the timepiece component. Therefore, even if the base material is configured to include the silicon, an effect of the reduced inertia force declines in the timepiece component.

It is conceivable to relax the stress by devising a structure of the rotation member and modifying a portion where the rotation member comes into contact with the axle when the axle is fitted into the through-hole. However, when the axle is inserted into the through-hole, there is a possibility that the portion in contact with the axle may be fragmented or broken (hereinafter, these will be referred to as "chipping").

SUMMARY

An advantage of some aspects of the invention is to provide a timepiece component, a timepiece movement, and a timepiece, which can inhibit chipping of a silicon-made substrate and which can inhibit a weight increase.

A timepiece component according to an aspect of the invention includes a silicon-made substrate having an insertion portion into which an axle is inserted, and a coating film disposed in a contact portion which comes into contact with at least the axle, at a surface of the substrate. The coating film contains metal alkoxide having a fluorine atom.

According to the aspect of the invention, the coating film contains the metal alkoxide having the fluorine atom. Accordingly, friction can be reduced in the portion in contact with the axle when the axle is inserted. In this manner, compared to a case having no coating film at the surface of the substrate, it is possible to inhibit damage such as chipping in the portion in contact with the axle.

Compared to a case where a stress relaxation layer is formed of metal such as nickel, a thickness dimension of the coating film can be reduced, and a weight of the timepiece component can be reduced. Therefore, an inertia force of the timepiece component can be reduced.

In the timepiece component according to the aspect of the invention, it is preferable that the coating film contains a polymer obtained by polymerizing the metal alkoxide.

According to the aspect of the invention with this configuration, the coating film containing the polymer obtained by polymerizing the metal alkoxide is used. Accordingly, compared to a case where the polymer is not contained, strength of the coating film is likely to increase. In this manner, the coating film is inhibited from being separated, and an effect of inhibiting the chipping is more evidently achieved.

In the timepiece component according to the aspect of the invention, it is preferable that the metal alkoxide has a long chain polymer group.

According to the aspect of the invention with this configuration, the long chain polymer group contained in the coating film is likely to be in an entangled state. Accordingly, density of the coating film is likely to increase. In this manner, the coating film is further inhibited from being separated, and the effect of inhibiting the chipping is more evidently achieved.

In the timepiece component according to the aspect of the invention, it is preferable that the long chain polymer group is at least any one type of a fluoroalkyl group, a perfluoroalkyl group, and a perfluoroalkylene ether group.

In the timepiece component according to the invention with this configuration, compared to a case where the coating film contains the long chain polymer group which does not have the fluorine atom as the long chain polymer group, free energy of the surface of the coating film can be reduced. In this manner, a friction reduction effect is more evidently achieved in the portion in contact with the axle. As a result, the effect of inhibiting the chipping is more evidently achieved.

In the timepiece component according to the aspect of the invention, it is preferable that a silicon oxide layer is disposed on the surface of the substrate, and that the coating film is disposed on a surface of the silicon oxide layer.

According to the aspect of the invention with this configuration, metal derived from the metal alkoxide is easily coupled with the silicon oxide layer via an oxygen atom. In this manner, it becomes easy to form the coating film having high density and excellent adhesion. As a result, the effect of inhibiting the chipping is more evidently achieved.

In the timepiece component according to the aspect of the invention, it is preferable that the metal alkoxide is a silane coupling agent.

According to the aspect of the invention with this configuration, silicon derived from the silane coupling agent is likely to be coupled with the base material (or the silicon oxide layer in a case where the silicon oxide layer is present) via the oxygen atom. In this manner, it becomes easy to form the coating film having the high density and the excellent adhesion. As a result, the effect of inhibiting the chipping is more evidently achieved.

In the timepiece component according to the aspect of the invention, it is preferable that the timepiece component is an escape wheel.

According to the aspect of the invention with this configuration, friction can be reduced in the portion in contact with the axle when the axle is inserted into the escape wheel. In this manner, it is possible to inhibit the chipping in the portion in contact with the axle.

If the coating film is formed in a tooth meshing with a pallet of a pallet fork of the escape wheel, friction in a sliding portion between the escape wheel and the pallet fork is reduced. Accordingly, energy transfer efficiency can be improved. Therefore, the timepiece movement is equipped with the escape wheel according to the aspect of the invention, thereby improving an oscillation angle of a balance with hairspring. In this manner, when a timepiece including the timepiece movement is used while being worn on a user's arm, mobile accuracy represented by time accuracy is improved. If the energy transfer efficiency is improved, torques of a mainspring can be reduced. Therefore, the timepiece movement, that is, the timepiece can be driven for a longer period of time.

In the timepiece component according to the aspect of the invention, it is preferable that the escape wheel includes a rim having a plurality of teeth, a first holder extending in a direction from the rim toward the axle, and a second holder having a first portion extending in a direction intersecting the first holder, and a second portion connected to the first portion and extending in a direction from the first portion toward the axle.

According to the aspect of the invention with this configuration, when the axle (for example, an escape pinion) is inserted into the escape wheel, friction can be reduced between each contact portion of the first holder and the second holder which are located in the insertion portion and the axle. In this manner, it is possible to further inhibit the chipping in each contact portion of the first holder and the second holder.

A timepiece movement according to another aspect of the invention includes the above-described timepiece component and the axle.

According to the aspect of the invention, the timepiece movement is realized which can inhibit the chipping in the contact portion between the timepiece component and the axle, when the axle is inserted into the timepiece component.

According to the aspect of the invention, if the coating film is formed in a tooth where the timepiece component meshes with another timepiece component, the friction is reduced on a sliding surface between the timepiece components. Therefore, the timepiece movement having improved energy transfer efficiency can be realized.

A timepiece according to still another aspect of the invention includes the above-described timepiece movement and an indicating hand driven by the timepiece movement.

According to the aspect of the invention, the timepiece is realized which can inhibit the chipping in the contact portion between the timepiece component and the axle, when the axle is inserted into the timepiece component.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a first embodiment according to the invention will be described with reference to the drawings. In the first embodiment, a mechanical timepiece 1 will be described as an example of a timepiece according to the invention. As an example of a timepiece component according to the invention, an escape wheel (escape wheel unit) 110 will be described. In each drawing below, in order to allow each layer or each member to have a substantially recognizable size, each layer or each member may be illustrated using a scale different from an actual scale, in some cases.

Mechanical Timepiece

First, the mechanical timepiece 1 serving as the timepiece according to the first embodiment will be described.

Figure 1:
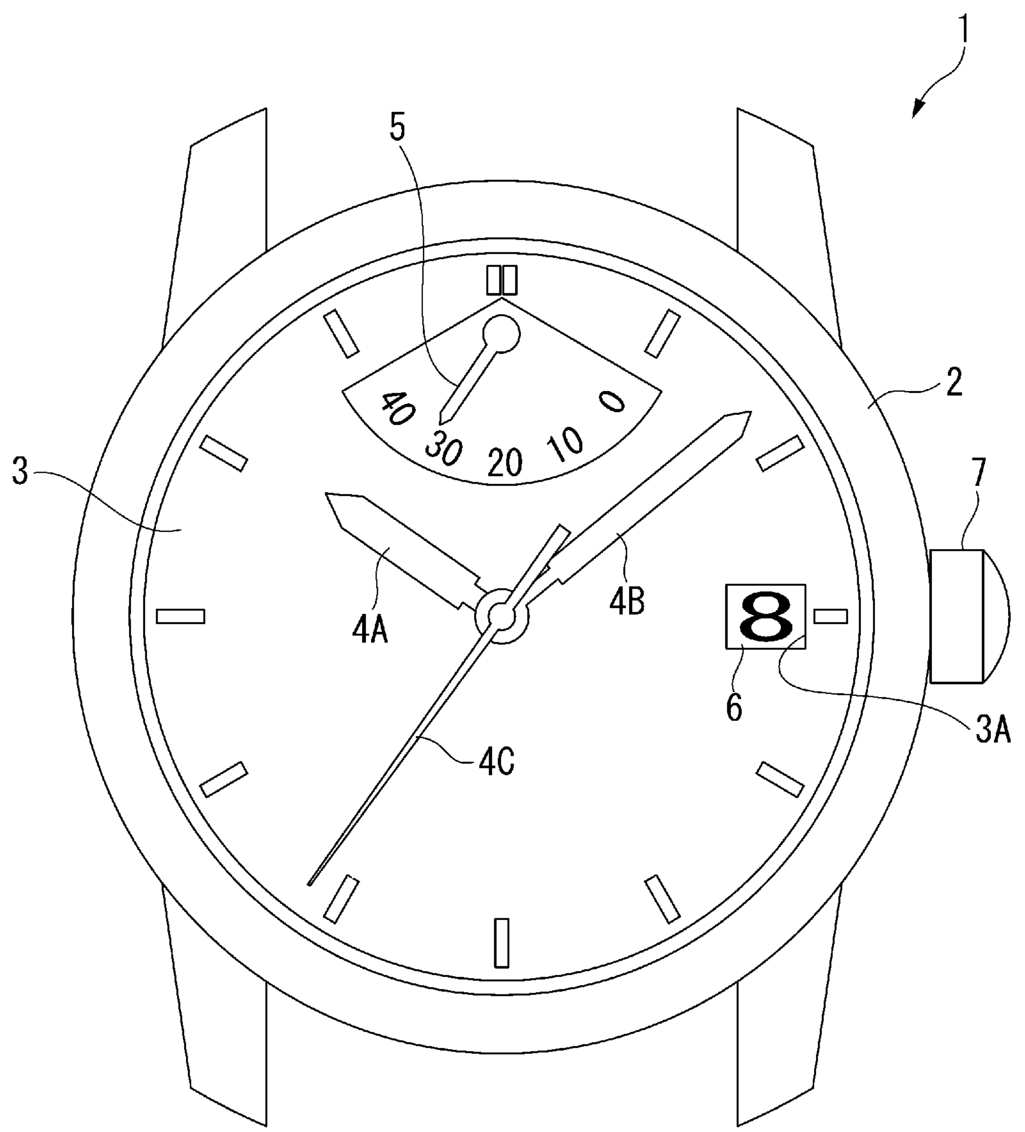
FIG. 1 is a front view of a mechanical timepiece according to a first embodiment of the invention.

FIG. 1 is a front view of the mechanical timepiece 1.

The mechanical timepiece 1 includes a cylindrical exterior case 2. A disc-shaped dial 3 is located on an inner peripheral side of the exterior case 2. The exterior case 2 has two openings. One opening on a front surface side is closed by cover glass, and the other opening on a rear surface side is closed by a case back.

The mechanical timepiece 1 includes a movement 10 (refer to FIG. 2) serving as a timepiece movement accommodated inside the exterior case 2, an hour hand 4A, a minute hand 4B, and a second hand 4C which display time information, and a power reserve hand 5 indicating a durable operation time used by a mainspring.

The respective indicating hands (the hour hand 4A, the minute hand 4B, and the second hand 4C) and the power reserve hand 5 are attached to an indicating hand axle of the movement 10, and are driven by the movement 10.

The dial 3 has a small calendar window 3A, and a date indicator 6 is visible through the small calendar window 3A.

A crown 7 is disposed on a side surface of the exterior case 2. The crown 7 can be pulled two stages from a normal position (zero stage position) pressed into a center of the mechanical timepiece 1.

If the crown 7 is rotated at the zero stage position, the mainspring can be wound as will be described later. In conjunction with the winding of the mainspring, the power reserve hand 5 moves. The mechanical timepiece 1 according to the present embodiment can ensure the durable operation time of approximately 40 hours in a case where the mainspring is fully wound.

If the crown 7 is pulled to a first stage position and is rotated, the date indicator 6 can be moved so as to adjust the date. If the crown 7 is pulled to a second stage position, the second hand 4C stops. If the crown 7 is rotated at the second stage position, the hour hand 4A and the minute hand 4B can be moved so as to adjust the time.

Movement

Figure 2:
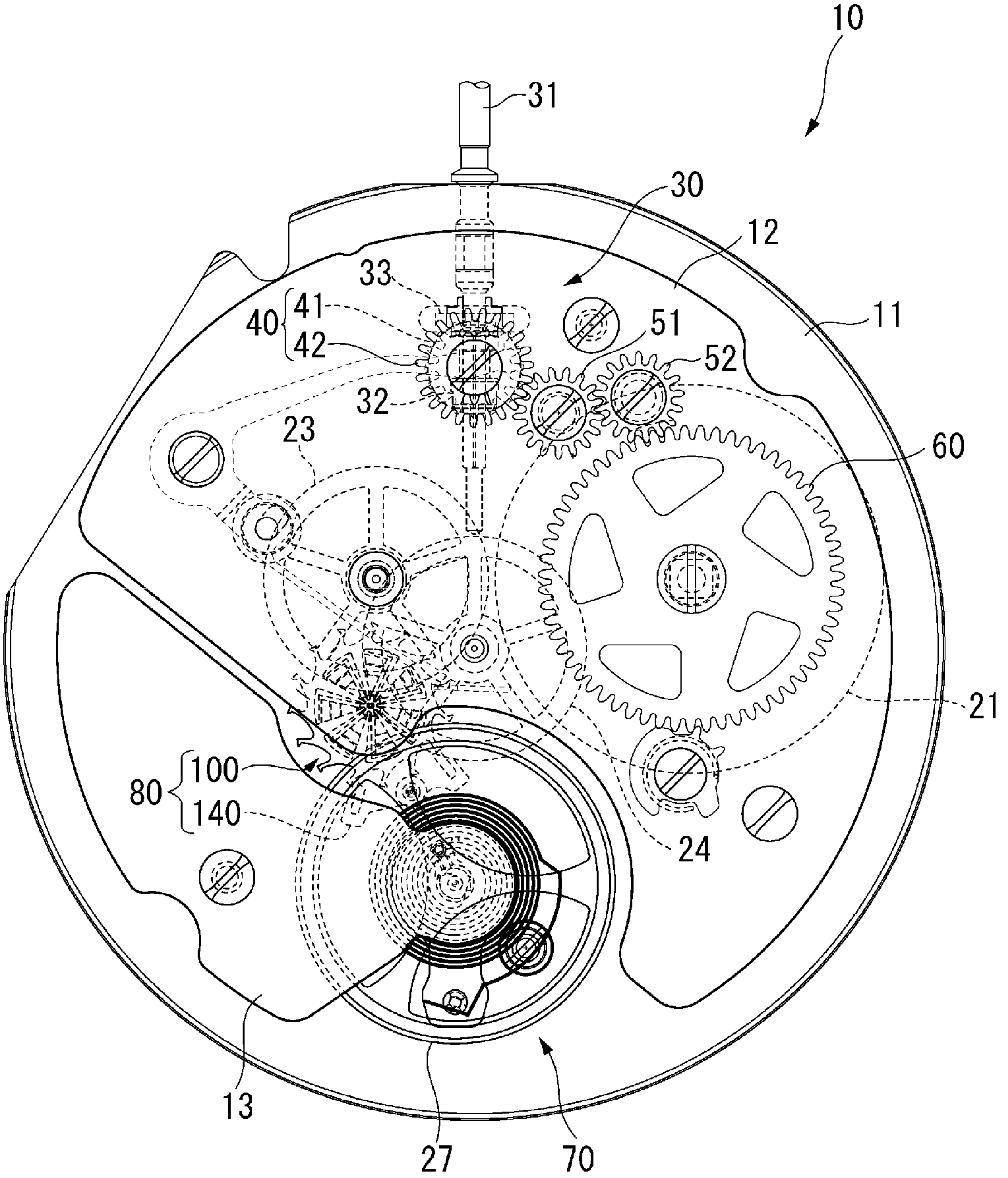
FIG. 2 is a plan view illustrating a front side of a movement of the mechanical timepiece according to the first embodiment of the invention.

FIG. 2 is a plan view illustrating a front side of the movement 10 of the mechanical timepiece 1. In FIG. 2, a forward side from the drawing, that is, a side of the case back in a main plate 11 will be referred to as a front side, and a rearward side, that is, a side of the cover glass in the main plate 11 will be referred to as a rear side.

The movement 10 includes the main plate 11, a barrel and train wheel bridge 12, and a balance bridge 13. The dial 3 (refer to FIG. 1) is located on the rear side of the main plate 11. A train wheel incorporated on the front side of the movement 10 is called a front train wheel, and the train wheel incorporated on the rear side of the movement 10 is called a rear train wheel.

A movement barrel (first wheel & pinion) 21 accommodating the mainspring, a center wheel & pinion (not illustrated), a third wheel & pinion 23, a second wheel & pinion 24, and an escape wheel (fifth wheel & pinion) 100 are arranged between the main plate 11 and the barrel and train wheel bridge 12. A pallet fork 140 and a balance with hairspring 27 are arranged between the main plate 11 and the balance bridge 13. The escape wheel & pinion 100 and the pallet fork 140 configure an escapement 80, and the balance with hairspring 27 configures a speed regulator 70.

Hand-Winding Mechanism

A hand-winding mechanism 30 includes a winding stem 31, a clutch wheel 32, a winding pinion 33, a crown wheel 40, a first intermediate wheel 51, and a second intermediate wheel 52, which are axially supported so as to be rotatable by the barrel and train wheel bridge 12. The hand-winding mechanism 30 transmits rotation using a rotation operation of the crown 7 to a ratchet wheel 60, and rotates the ratchet wheel 60 and a barrel arbor (not illustrated) so as to wind the mainspring. The crown wheel 40 is configured to include a first crown wheel 41 meshing with the winding pinion 33, and a second crown wheel 42 rotated integrally with the first crown wheel 41 and meshing with the first intermediate wheel 51.

Escape Wheel & Pinion

Figure 3:
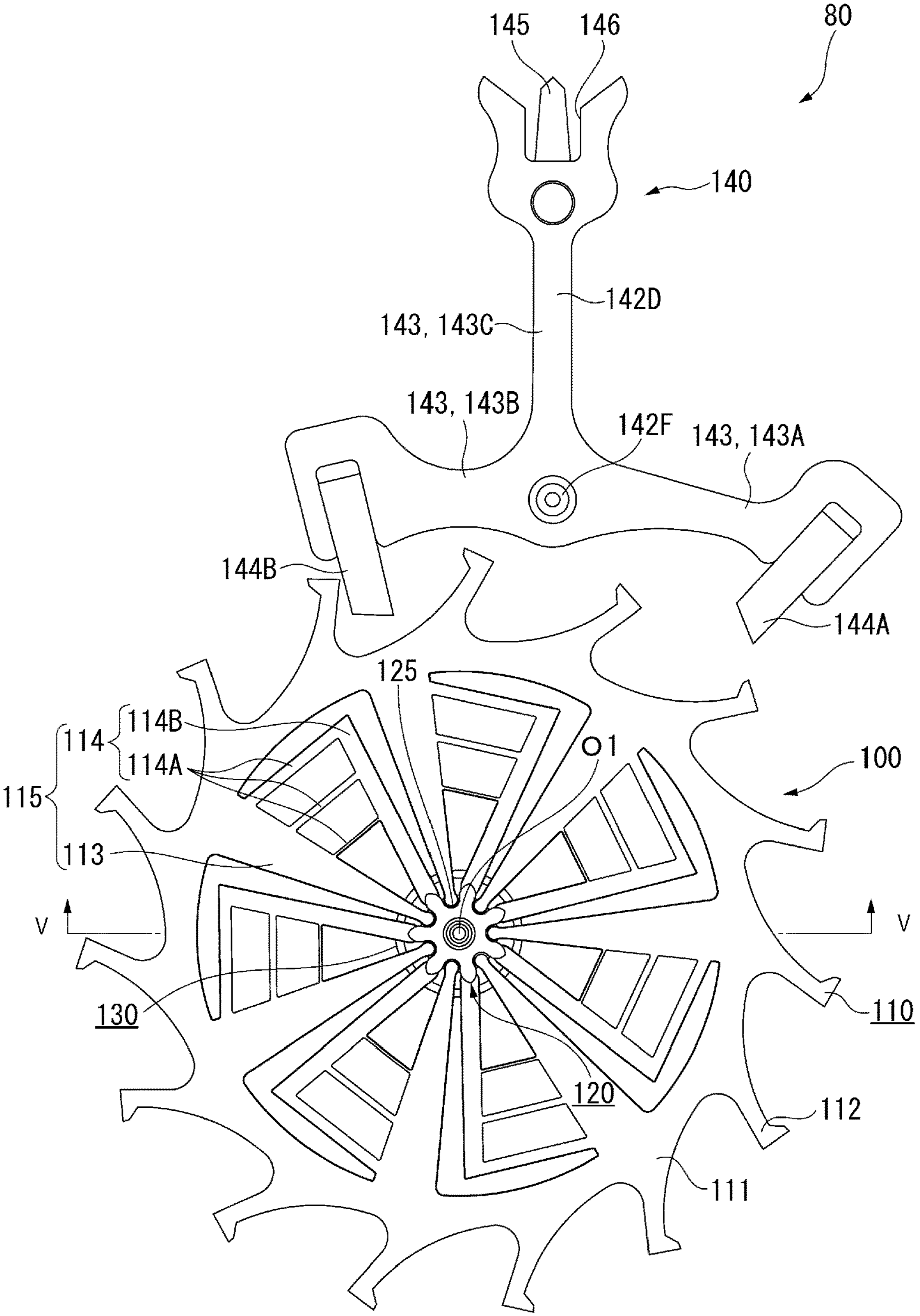
FIG. 3 is a plan view of an escapement according to the first embodiment of the invention.
Figure 4:
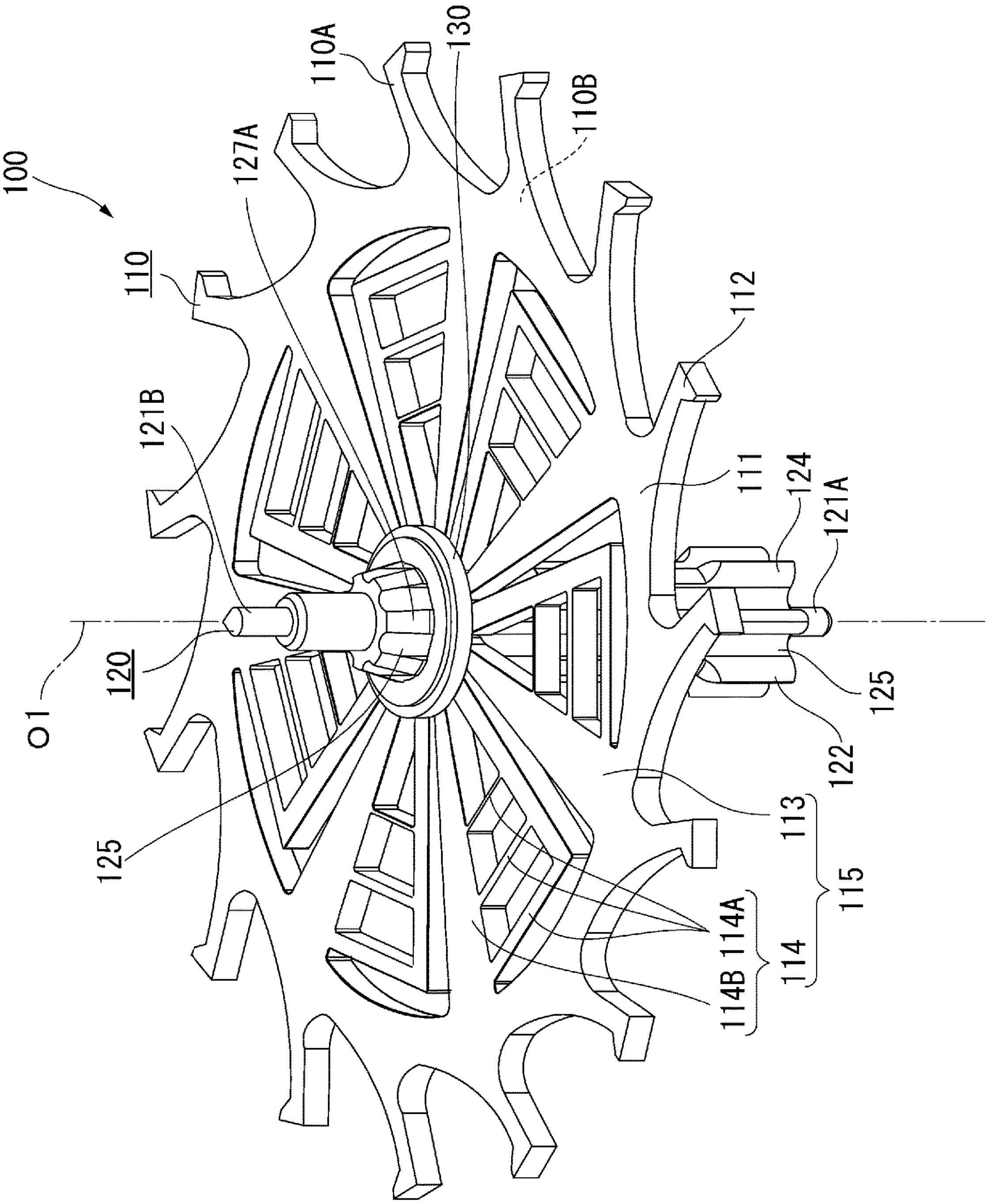
FIG. 4 is a perspective view when an escape wheel according to the first embodiment of the invention is viewed from a front surface side.
Figure 5:
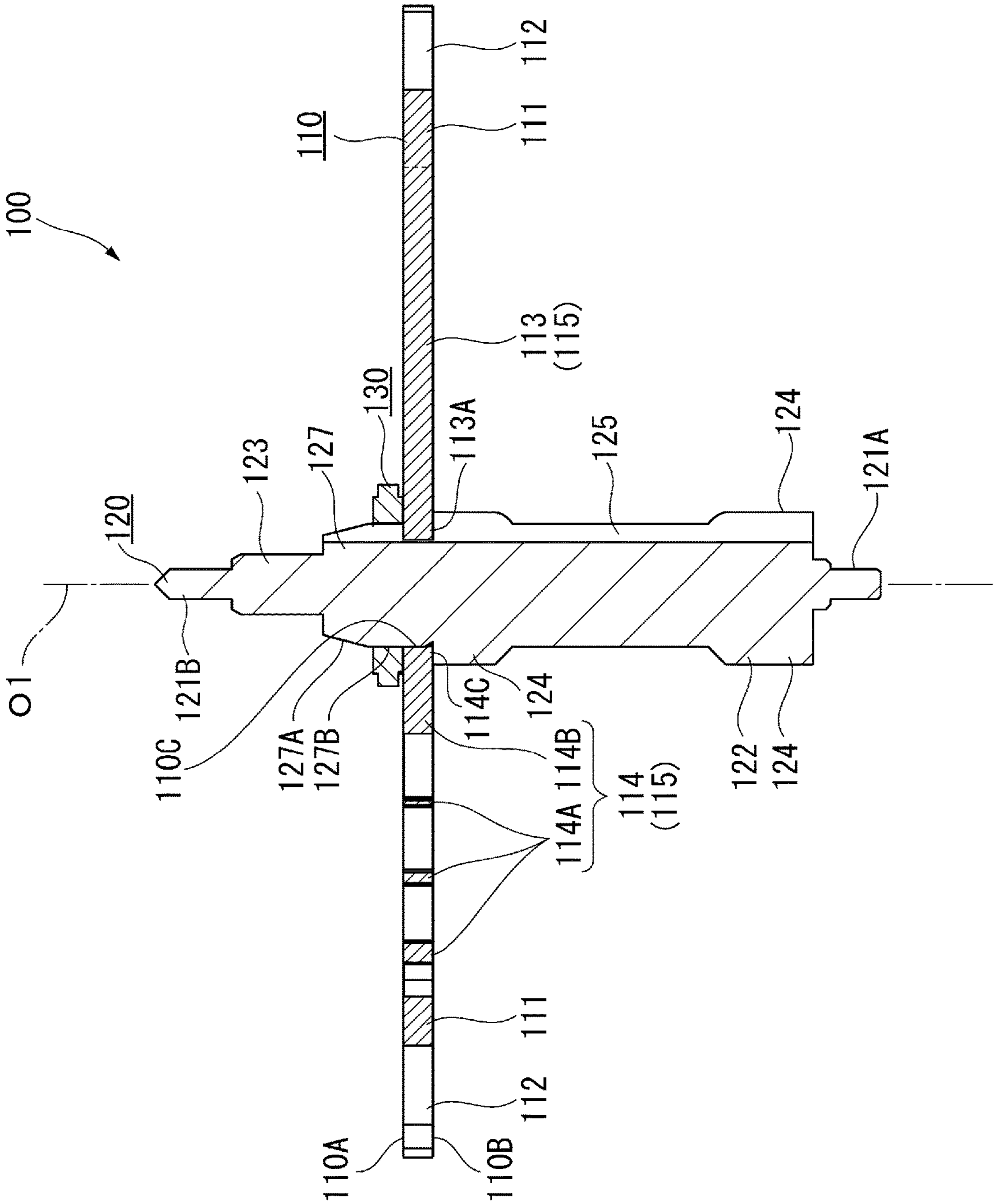
FIG. 5 is a sectional view taken along line V-V in FIG. 3.
Figure 6:
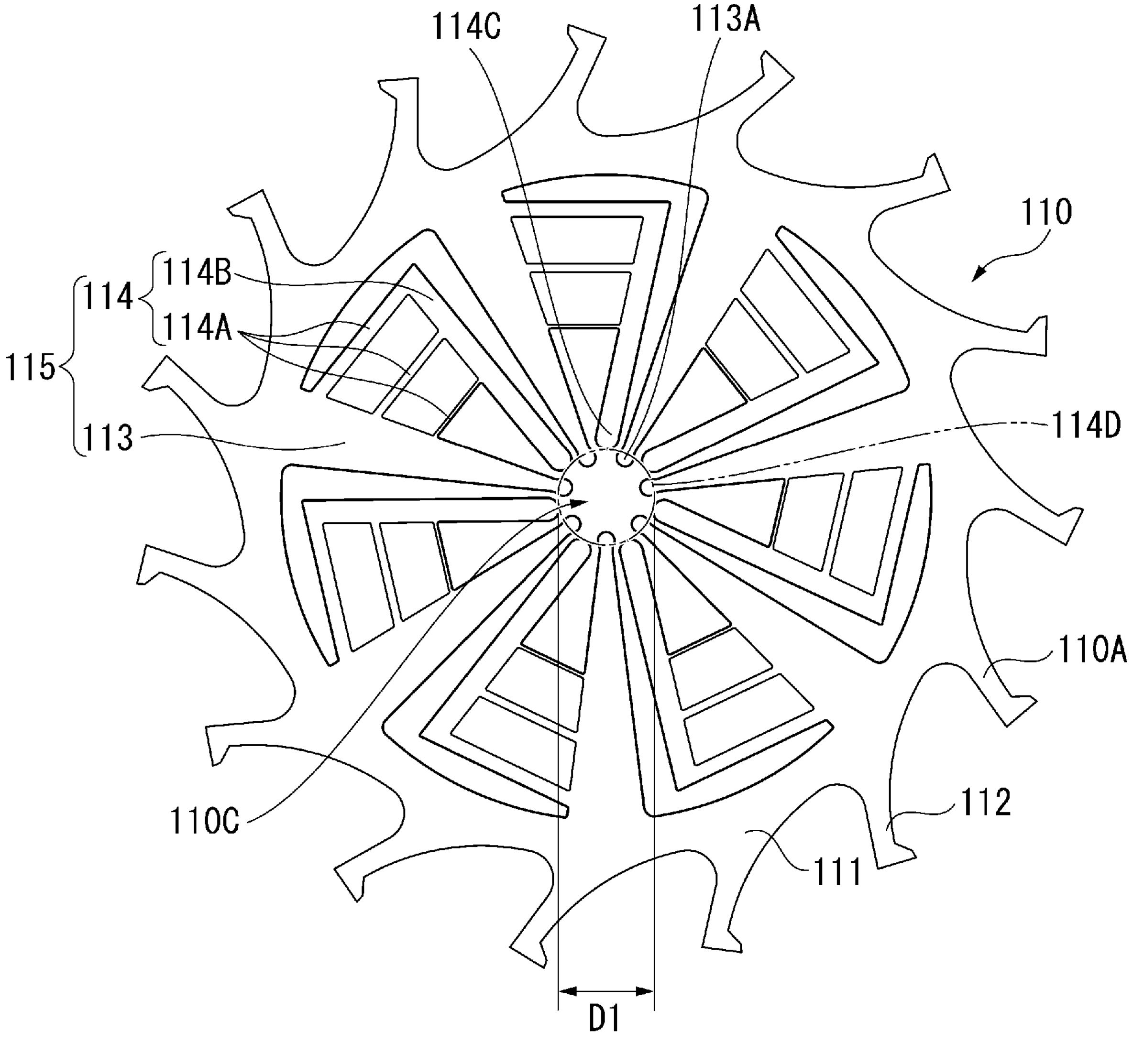
FIG. 6 is a plan view of an escape wheel serving as a timepiece component according to the first embodiment of the invention.
Figure 7:
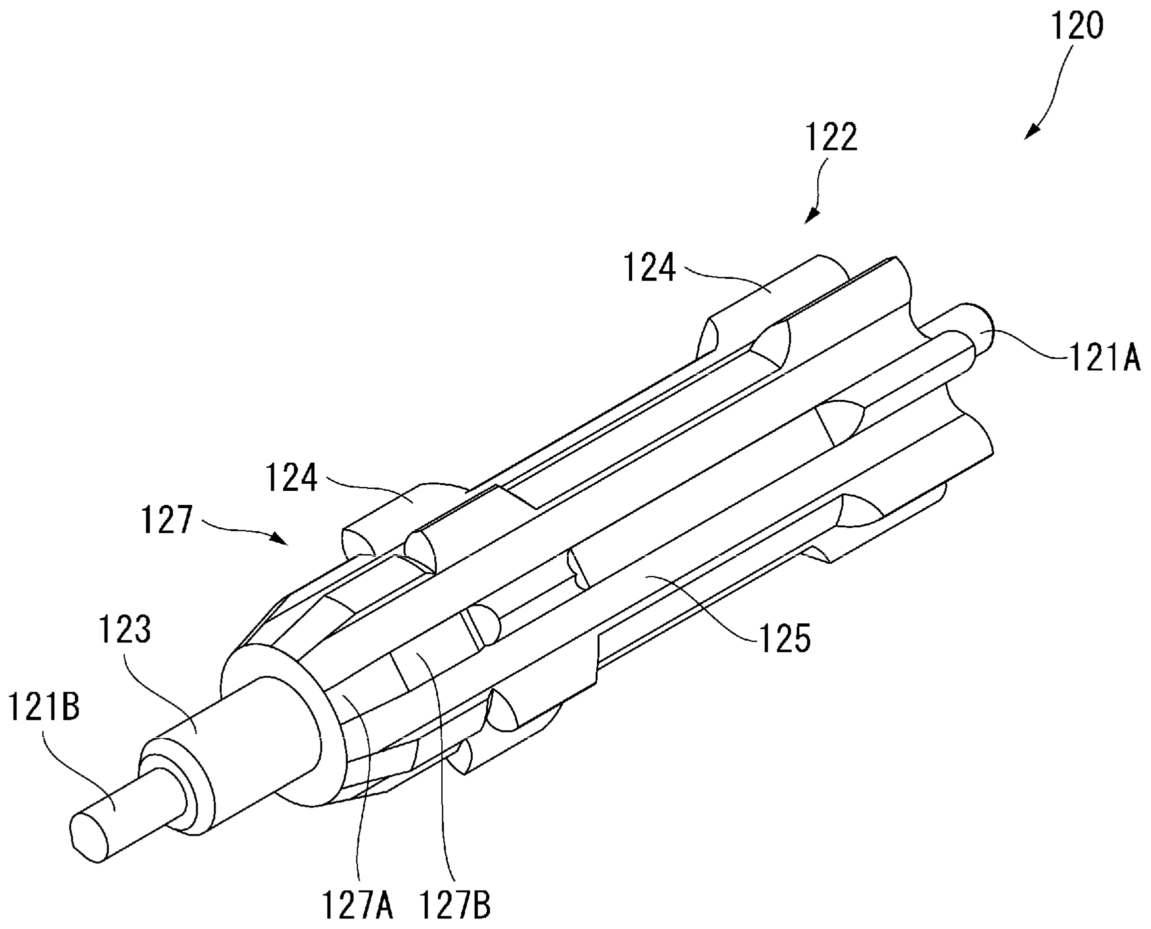
FIG. 7 is a perspective view of an axle according to the first embodiment of the invention.
Figure 8:
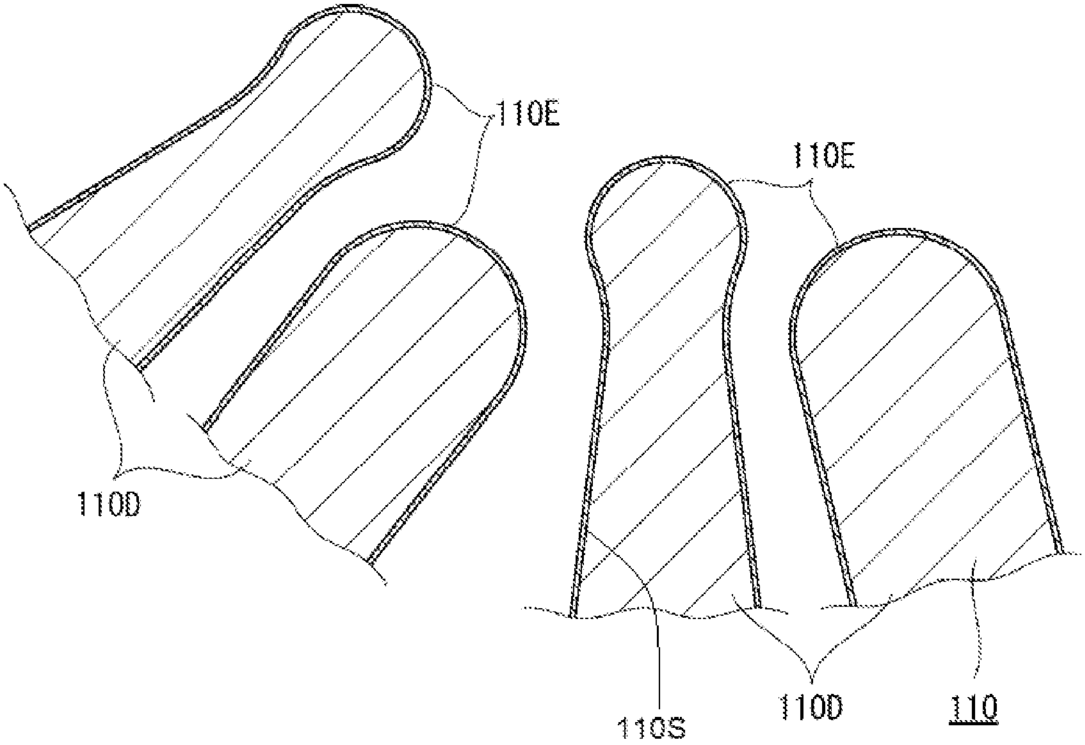
FIG. 8 is an enlarged sectional view illustrating a substrate and a coating film according to the first embodiment of the invention.

Next, a configuration of the escape wheel & pinion 100 will be described with reference to FIGS. 3 to 8. FIG. 3 is a plan view of the escapement 80. FIG. 4 is a perspective view when the escape wheel & pinion 100 is viewed from the front surface side (main plate 11 side). FIG. 5 is a sectional view of the escape wheel & pinion 100 taken along line V-V in FIG. 3. FIG. 6 is a plan view of the escape wheel 110 serving as the timepiece component. FIG. 7 is a perspective view of an axle 120. FIG. 8 is an enlarged sectional view illustrating a substrate 110D and a coating film 110E which configure an escape wheel 110.

In the following description, a longitudinal direction along an axis O1 of the escape wheel 110 and the axle 120 will be simply referred to as an axial direction. A front surface 110A and a rear surface 110B of the escape wheel 110 are orthogonal to the axis O1 (line passing through the center of the axle 120 along the axial direction). A direction passing through the axis O1 in a plane parallel to the front surface 110A and the rear surface 110B of the escape wheel 110 will be referred to as a radial direction. A direction turning around the axis O1 of the escape wheel 110 and the axle 120 will be referred to as a circumferential direction.

As illustrated in FIG. 3, the escapement 80 includes the escape wheel & pinion 100 and the pallet fork 140. As illustrated in FIG. 4, the escape wheel & pinion 100 includes the escape wheel 110 serving as the timepiece component, the axle 120 inserted into an insertion portion 110C (refer to FIG. 5) of the escape wheel 110, and a fixing ring 130 which fixes the escape wheel 110 to the axle 120.

Escape Wheel

As illustrated in FIG. 6, a central portion of the escape wheel 110 has the insertion portion 110C into which the axle 120 is inserted.

As illustrated in FIG. 8, the escape wheel 110 has the silicon-made substrate 110D and the coating film 110E disposed in a contact portion which comes into contact with at least the axle 120 on the front surface of the substrate 110D. In the escape wheel 110 according to the present embodiment, the coating film 110E is disposed on the whole front surface of the silicon-made substrate 110D.

The substrate 110D is a member configuring the escape wheel 110, and represents the escape wheel in a state where the coating film 110E is not disposed therein.

The substrate 110D and the coating film 110E will be described in detail later.

As illustrated in FIGS. 4 and 5, in the escape wheel 110, the front surface 110A and the rear surface 110B are flat surfaces, and have a plate shape having a uniform thickness throughout the entity.

The escape wheel 110 has a rim 111 having a plurality of teeth 112 and a holder 115 for holding the axle 120. The rim 111 is an annular portion of an outer edge of the escape wheel 110. The teeth 112 protrude outward from an outer periphery of the rim 111, and are formed in a special hook shape. As illustrated in FIG. 3, pallets 144A and 144B of the pallet fork 140 are brought into contact with each tip of the plurality of teeth 112.

The holder 115 is located on the axle 120 side with respect to the rim 111. In the present embodiment, the escape wheel 110 has seven holders 115. The holders 115 are arranged at seven positions in the circumferential direction of the annular rim 111 at an equal pitch of 360°/7. The number of the holders 115 may be in a range of three to seven, and may be seven or more. The number is not particularly limited.

The holder 115 has a first holder 113 extending from the rim 111 and a second holder 114 disposed by being branched from the first holder 113. The first holder 113, the second holder 114 (a first portion 114A and a second portion 114B), and the rim 111 are integrally formed of the same material (silicon).

According to the present embodiment, in a central portion of the escape wheel 110, a region surrounded with the holder 115 (the first holder 113 and the second holder 114) configures the insertion portion 110C into which the axle 120 is inserted. In other words, the holder 115 (the first holder 113 and the second holder 114) configures the insertion portion 110C into which the axle 120 is inserted, in the central portion of the escape wheel 110.

As illustrated in FIG. 6, the first holder 113 extends in a direction from the rim 111 toward the axle 120, and is formed so that the width decreases toward the axle 120. The tip of the first holder 113 on the axle 120 side serves as a contact portion 113A which comes into contact with the axle 120. The contact portion 113A is formed in a planarly arc shape. The first holder 113 has a function to inhibit the rotation of the escape wheel 110 with respect to the axle 120 by fitting the contact portion 113A into a groove 125 of the axle 120. The contact portion 113A of the first holder 113 is located at a center axis of the axle 120 from the tip of the second portion 114B of the second holder 114 (refer to FIG. 6).

The second holder 114 has the first portion 114A and the second portion 114B. The second holder 114 has a function to fix the axle 120 to the center of the escape wheel 110 and to inhibit the escape wheel 110 from being inclined with respect to or falling out of the axle 120.

The first portion 114A is connected to the first holder 113, and is formed by being branched from the first holder 113 so as to extend in a direction intersecting an extending direction of the first holder 113. The second holder 114 has a plurality of the first portions 114A. The first portions 114A are arranged substantially parallel to each other. The second portion 114B is connected to a plurality of the first portions 114A, and extends in a direction toward the axle 120. The width of the second portion 114B is substantially constant, and the tip on the axle 120 side serves as a contact portion 114C which comes into contact with the axle 120. The contact portion 114C is formed in a planarly arc shape. A plurality of the first portions 114A have a function to relax stress applied to the second portion 114B in the extending direction of the second portion 114B.

The second portion 114B is fitted to a fitting surface 127B of the axle 120 (refer to FIG. 5). An inscribed circle in contact with the tip (the contact portion 114C) of the second portion 114B is set as an inscribed circle 114D (refer to FIG. 6). In a state where the second portion 114B is not fitted to the fitting surface 127B of the axle 120 (state where the axle 120 is not inserted into the insertion portion 110C of the escape wheel 110), that is, in a state where the stress is not applied to the second holder 114, a diameter of the inscribed circle 114D is set as D1. The diameter D1 of the inscribed circle 114D is also referred to as an inner diameter of the second holder 114. The first holder 113 extends inward of the inscribed circle 114D.

If the escape wheel 110 is viewed from the axle 120, the first holder 113 and the second portion 114B respectively extend radially outward in the radial direction. In a plane parallel to the front surface 110A of the escape wheel 110, the extending direction of the first holder 113 and the extending direction of the second port ion 114B are respectively directions extending along the radial direction. However, both the extending directions are not parallel to each other. In the plane parallel to the front surface 110A of the escape wheel 110, the extending direction of the first portion 114A is a direction intersecting the extending direction of the first holder 113 and the extending direction of the second portion 114B.

A plurality of the first portions 114A formed in a beam shape between the first holder 113 and the second portion 114B are less likely to be bent in the extending direction, inside a surface (the front surface 110A and the rear surface 110B of the escape wheel 110) configured to include a plurality of the first portions 114A. However, a plurality of the first portions 114A are likely to be bent in the direction (radial direction) intersecting the extending direction. A plurality of the first portions 114A are less likely to be bent in the axial direction intersecting the surface configured to include a plurality of the first portions 114A.

If a plurality of the first portions 114A are bent and deformed outward in the extending direction of the second portion 114B, the inner diameter of the second holder 114, that is, the diameter of the inscribed circle 114D (refer to FIG. 6) in contact with the contact portion 114C of the second portion 114B becomes larger than the diameter D1. Therefore, when the axle 120 is inserted into the insertion portion 110C of the escape wheel 110, a plurality of the first portions 114A are bent corresponding to the outer diameter of the axle 120, and are deformed in the extending direction of the second portion 114B with respect to the axle 120. In this manner, the second portion 114B can be easily fitted to the fitting surface 127B of the axle 120.

When an external force is applied to the escape wheel & pinion 100, the first portion 114A is likely to be deformed in the extending direction of the second portion 114B. Accordingly, the axle 120 can be held around the center of the escape wheel 110. Since a plurality of the first portions 114A are bent, the external force applied to the escape wheel & pinion 100 can be relaxed. Accordingly, damage to the escape wheel 110 can be suppressed. On the other hand, since a plurality of the first portions 114A are less likely to be deformed in the axial direction, that is, in a direction in which the axle 120 falls out of the escape wheel 110. Therefore, the escape wheel 110 and the axle 120 can be reliably fixed to each other, and it is possible to inhibit the escape wheel 110 from being inclined with respect to or falling out of the axle 120.

A plurality of the teeth 112 of the escape wheel 110 mesh with the pallet fork 140. The pallet fork 140 includes a pallet pork body 142D and a pallet staff 142F serving as an axle. The pallet pork body 142D is formed in a T-shape by three pallet beams 143 between pallet arms 143A and 143B and a pallet pole 143C, and is configured to be rotatable by the pallet staff 142F. Both ends of the pallet staff 142F are respectively supported so as to be rotatable with respect to the main plate 11 (refer to FIG. 2) and a pallet bridge (not illustrated).

In the three pallet beams 143, the pallets 144A and 144B are disposed in the tip of the two pallet beams 143 (pallet arms 143A and 143B), and a blade tip 145 is attached to the tip of the remaining pallet beam 143 (pallet pole 143C). The tip of the pallet beam 143 (pallet pole 143C) is formed in a substantially U-shape in a plan view, and an inner space thereof serves as a pallet receptacle 146. The pallets 144A and 144B are rubies formed in a quadrangular prism shape, and are adhered and fixed to the pallet beam 143 by using an adhesive.

When the pallet fork 140 configured in this way is rotated around the pallet staff 142F, the pallet 144A or the pallet 144B comes into contact with the tip of the tooth 112 of the escape wheel & pinion 100. In this case, the pallet beam 143 (pallet pole 143C) comes into contact with a banking pin (not illustrated). In this manner, the pallet fork 140 is no longer rotated in the same direction. As a result, the rotation of the escape wheel & pinion 100 is temporarily stopped.

As illustrated in FIG. 3, the axle 120 is located in the central portion of the escape wheel 110 in a plan view in the axial direction of the axle 120. As illustrated in FIG. 5, the axle 120 is inserted into the insertion portion 110C surrounded with the holder 115 of the escape wheel 110 from the rear surface 110B side of the escape wheel 110, and is fixed by the fixing ring 130 incorporated from the front surface 110A side of the escape wheel 110.

The axle 120 has a fitting surface 127B fitted to the holder 115. The holder 115 (the second portion 114B of the second holder 114) of the escape wheel 110 is fitted to the fitting surface 127B of the axle 120 in the insertion portion 110C. In this manner, the axle 120 is fixed at a center position in a plane of the escape wheel 110.

As illustrated in FIGS. 4, 5, and 7, the axle 120 has tenons 121A and 121B, an escape pinion 122, a first insertion portion 123, and a second insertion portion 127.

The tenons 121A and 121B are located at both ends in the axial direction of the axle 120. The tenon 121A located on the rear surface 110B side of the escape wheel 110 in the tenons 121A and 121B is rotatably supported by a train wheel bridge (not illustrated), and the tenon 121B located on the front surface 110A side of the escape wheel 110 is rotatably supported by the main plate 11.

The escape pinion 122 is located on the rear surface 110B side of the escape wheel 110. The escape pinion 122 meshes with a wheel of the above-described second wheel & pinion 24 (refer to FIG. 2). Since the escape pinion 122 meshes with the second wheel & pinion 24, the rotational force of the second wheel & pinion 24 is transmitted to the axle 120 so as to rotate the escape wheel & pinion 100.

The first insertion portion 123 is formed to have a diameter larger than that of the tenons 121A and 121B, and the second insertion portion 127 is formed to have a diameter larger than that of the first insertion portion 123. The first insertion portion 123 and the second insertion portion 127 are inserted into the insertion portion 110C of the escape wheel 110 from the rear surface 110B side.

It is preferable that the axle 120 is formed of a metal material which is excellent in rigidity and heat resistance and which allows satisfactory workability in cutting and grinding, and it is more preferable that the axle 120 is formed of carbon steel. The material of the axle 120 may be tantalum (Ta) or tungsten (W).

The fixing ring 130 is an annular member having an opening portion, and has a circular planar shape. The axle 120 is inserted into the opening portion of the fixing ring 130. In other words, the fixing ring 130 is fitted into the second insertion portion 127 of the axle 120 from the tenon 121B side.

The fixing ring 130 is located on the tenon 121B side opposite to the escape pinion 122 across the escape wheel 110 in the axial direction of the axle 120. The inner diameter of the opening portion of the fixing ring 130 is designed to be slightly smaller than the outer diameter of the second insertion portion 127 of the axle 120. Therefore, the fixing ring 130 is fitted to the axle 120 (that is, the axle 120 is inserted into the opening portion of the fixing ring 130) so that the fixing ring 130 is fixed to the axle 120. In this manner, the escape wheel 110 is fixed by being interposed between the axle 120 and the fixing ring 130. Therefore, the fixing ring 130 functions as a fixing member which fixes the escape wheel 110 to the axle 120.

The escape pinion 122 has a plurality of teeth 124. A plurality of the teeth 124 extend along the axial direction of the axle 120, and are formed to protrude outward in the radial direction. According to the present embodiment, an intermediate portion in the axial direction of the tooth 124 is cut in order to reduce the weight. The tenon 121B side of a plurality of the teeth 124 is in contact with the rear surface of the holder 115 (second portion 114B) of the escape wheel 110, and is fixed so that the escape wheel 110 does not move in the axial direction of the axle 120. A groove 125 is formed along the axial direction between a plurality of the teeth 124 in the circumferential direction. The groove 125 extends from the escape pinion 122 to the second insertion portion 127 along the axial direction (refer to FIG. 5).

According to the present embodiment, the escape pinion 122 has seven teeth 124 meshing with the second wheel & pinion 24. The teeth 124 are arranged at seven locations in the circumferential direction of the escape pinion 122 at an equal pitch of 360°/7. The grooves 125 are arranged at seven locations in the circumferential direction of the escape pinion 122 at an equal pitch of 360°/7. According to the present embodiment, the number of the teeth 124 and the groove 125 is seven. However, the number is not particularly limited.

The second insertion portion 127 is separated by the groove 125 in the circumferential direction. Therefore, tapered surfaces 127A and the fitting surfaces 127B of the second insertion portion 127 are arranged at seven locations in the circumferential direction on the tenon 121B side of the axle 120 at an equal pitch of 360°/7. The tapered surfaces 127A, the fitting surfaces 127B, and the teeth 124 are disposed at the same position in the circumferential direction of the axle 120.

A cross section of the escape wheel & pinion 100 illustrated in FIG. 5 is taken along line V-V of FIG. 3. That is, the left side in FIG. 5 represents a cross section passing through the second insertion portion 127 of the axle 120 and the tooth 124 of the escape pinion 122, and the right side represents a cross section passing through the groove 125 of the axle 120.

As illustrated in FIG. 7, the groove 125 is linearly disposed along the axial direction from the escape pinion 122 to the second insertion portion 127. The groove 125 is formed so as to be recessed inward of the tooth 124 of the escape pinion 122, the tapered surface 127A, and the fitting surface 127B in the radial direction (refer to FIG. 5). The groove 125 has a function to inhibit the rotation of the escape wheel 110 with respect to the axle 120 by being fitted to the contact portion 113A of the first holder 113.

The groove 125 is disposed from the second insertion portion 127 to the escape pinion 122. Accordingly, when the axle 120 is inserted into the escape wheel 110 from the tenon 121B side, if the position of the first holder 113 and the position of the groove 125 are aligned with each other in the circumferential direction, the axle 120 can be inserted in a state where the first holder 113 is fitted to the groove 125 (refer to FIG. 5).

Next, a configuration of the escape wheel 110 according to the present embodiment will be described in detail.

As illustrated in FIG. 8, the escape wheel 110 according to the present embodiment has the substrate 110D (the escape wheel in a state where the coating film is not formed), and the coating film 110E formed on the whole front surface of the substrate 110D. FIG. 8 illustrates an enlarged view of the contact portion 113A of the first holder 113 and the contact portion 114C of the second portion 114B. A thickness ratio of the coating film 110E to the substrate 110D is changed in order to facilitate the illustration, and is different from the actual ratio.

Substrate

The substrate 110D is a silicon-made substrate.

The silicon-made means that a main component is silicon (80% by mass or more, preferably 90% by mass or more with respect to the entire substrate). A type of the silicon is not particularly limited, and can be selected from those which are proper from a viewpoint of workability. As the silicon, single crystal silicon or polycrystal silicon may be used. These may be used alone, or may be used in combination of two or more types.

The silicon-made substrate 110D can be manufactured using a photolithography technology or an etching technology, for example, and can have excellent processing accuracy.

Coating Film

The coating film 110E contains metal alkoxide having a fluorine atom (hereinafter, also referred to as "metal alkoxide containing fluorine"), and the metal alkoxide containing the fluorine is the metal alkoxide having the fluorine atom in the molecular structure of the metal alkoxide.

Metal Alkoxide Containing Fluorine

For example, metal contained in the metal alkoxide containing fluorine includes Ti, Li, Si, Na, K, Mg, Ca, St, Ba, Al, In, Ge, Bi, Fe, Cu, Y, Zr and Ta. As the metal among these, it is preferable that the metal alkoxide containing fluorine contains silicon (Si), titanium (Ti), aluminum (Al), or zirconium (Zr). It is more preferable that the metal alkoxide containing fluorine contains the silicon. These may be used alone, or may be used in combination of two or more types.

According to the present embodiment, it is preferable that the metal alkoxide containing fluorine contained in the coating film 110E has a long chain polymer group.

In this manner, the coating film 110E is likely to be in a state where the long chain polymer group is entangled. Accordingly, density of the coating film 110E is likely to increase. As a result, the coating film 110E is further inhibited from being separated, and the effect of inhibiting the chipping is more evidently achieved.

Here, the term "long chain" means a chain having 3 to 30 carbon atoms configuring a main chain of a polymer chain.

In the coating film 110E, a plurality of types of the metal alkoxide containing fluorine holding the long chains having a different number of the carbon atoms are present in a mixed state.

The number of atoms configuring the main chain of the polymer chain is preferably 5 to 28, more preferably 7 to 26, and much more preferably 9 to 24.

A molecular weight of the long chain polymer group is preferably 310 to 1,500, more preferably 410 to 1,400, and much more preferably 500 to 1,300.

The long chain polymer group is preferably at least one type (hereinafter, referred to as a "specific fluorine-containing group") selected from a group including a fluoroalkyl group, a perfluoroalkyl group, and a perfluoroalkylene ether group.

The perfluoroalkylene ether group is represented by a formula: $—C_nF_{2n}—O—$ (n is an integer of 1 or greater) or a formula: $—(C_mF2_m—O)_p—$ (m is an integer of 1 or greater, and p is an integer of 1 or greater).

The long chain polymer group may be configured to contain one or more types, or two or more types. The long chain polymer group may be configured to contain not only a specific fluorine-containing group but also a group (for example, an alkyl group having no fluorine atom or an alkylene group having no fluorine atom) other than the specific fluorine-containing group.

In this manner, compared to a case where the coating film 110E contains the long chain polymer group having no fluorine atom, it possible to reduce free energy of the front surface of the coating film 110E. As a result, the friction in the portion in contact with the axle is reduced, and the effect of inhibiting the chipping is more evidently achieved.

The coating film 110E may contain one type alone of the above-described long chain polymer group, or may contain two or more types.

According to the present embodiment, it is preferable that the metal alkoxide containing fluorine is a silane coupling agent having the fluorine atom (hereinafter, referred to as a "silane coupling agent containing fluorine").

In this manner, the silicon derived from the silane coupling agent is likely to be coupled with the base material (silicon oxide layer 110S in a case where the silicon oxide layer 110S is present (FIG. 8)) via an oxygen atom. In this manner, it becomes easy to form the coating film 110E having the high density and the excellent adhesion. As a result, the effect of inhibiting the chipping is more evidently achieved.

As the silane coupling agent containing fluorine, it is preferable to use an organic silicon compound containing fluorine such as alkoxysilane. These may be used alone, or may be used in combination of two or more types.

For example, the organic silicon compound containing fluorine includes $CF_3$ $(CF_2)_{17}C_2H_4Si(OCH_3)_3$, $CF_3—CH_2CH_2—Si(OCH_3)_3$, $CF_3$ $(CF_2)_3—CH_2CH_2—Si(OCH_3)_3$, $CF_3$ $(CF_2)_5—CH_2CH_2—Si(OCH_3)_3$, $CF_3$ $(CF_2)_5—CH_2CH_2—Si(OC_2H_5)_3$, $CF_3$ $(CF_2)_7—CH_2CH_2—Si(OCH_3)_3$, $CF_3$ $(CF_2)_{11}—CH_2CH_2—Si(OC_2H_5)_3$, $CF_3$ $(CF_2)_3—CH_2CH_2—Si(CH_3)(OCH_3)_2$, $CF_3$ $(CF_2)_7—CH_2CH_2—Si(CH_3)(OCH_3)_2$, $CF_3(CF_2)_8—CH_2CH_2—Si(CH_3)(OC_2H_5)_2$, $CF_3$ $(CF_2)_2C_2H_4Si(OCH_3)_3$, $CF_3$ $(CF_2)_4C_2H_4Si(OCH_3)_3$, $CF_3$ $(CF_2)_6C_2H_4Si(OCH_3)_3$, $CF_3$ $(CF_2)_8C_2H_4Si(OCH_3)_3$, $CF_3$ $(CF_2)_{10}C_2H_4Si(OCH_3)_3$, $CF_3$ $(CF_2)_{12}C_2H_4Si(OCH_3)_3$, $CF_3$ $(CF_2)_{14}C_2H_4Si(OCH_3)_3$, $CF_3$ $(CF_2)_{16}C_2H_4Si(OCH_3)_3$, $CF_3$ $(CF_2)_{18}C_2H_4Si(OCH_3)_3$, $CF_3(CF_2)_6C_2H_4Si(OC_2H_5)_3$, $CF_3$ $(CF_2)_8C_2H_4Si(OC_2H_5)_3$, $CF_3$ $(CF_2)_6C_3H_6Si(OCH_3)_3$, $CF_3$ $(CF_2)_8C_3H_6Si(OCH_3)_3$, $CF_3$ $(CF_2)_6C_3H_6Si(OC_2H_5)_3$, $CF_3$ $(CF_2)_8C_3H_6Si(OC_2H_5)_3$, $CF_3$ $(CF_2)_6C_4H_8Si(OCH_3)_3$, $CF_3$ $(CF_2)_8C_4H_8Si(OCH_3)_3$, $CF_3$ $(CF_2)_6C_4H_8Si(OC_2H_5)_3$, $CF_3$ $(CF_2)_8C_4H_8Si(OC_2H_5)_3$, $CF_3$ $(CF_2)_6C_2H_4Si(CH_3)(OCH_3)_2$, $CF_3(CF_2)_8C_2H_4Si(CH_3)(OCH_3)_2$, $CF_3(CF_2)_6C_2H_4Si(C_2H_5)(OC_2H_5)_2$, and $CF_3$ $(CF_2)_8C_2H_4Si(C_2H_5)(OC_2H_5)_2$.

As the organic silicon compound containing fluorine, it is also suitable to use a compound containing an amino group.

For example, the compound includes $C_9F_{19}CONH(CH_2)_3Si(OC_2H_5)_3$, $C_9F_{19}CONH(CH_2)NH(CH_2)Si(OC_2H_5)_3$, $C_9F_{19}CONH(CH_2)_5CONH(CH_2)Si(OC_2H_5)_3$, $C_8F_{17}SO_2NH(CH_2)_5CONH(CH_2)Si(OC_2H_5)_3$, $C_3F_7O(CF(CF_3)CF_2O)_2—CF(CF_3)—CONH(CH_2)Si(OC_2H_5)_3$, and $C_3F_7O(CF(CF_3)CF_2O)m'—CF(CF_3)—CONH(CH_2)Si(OCH_3)_3$ [here, m' is an integer of 1 or greater (the upper limit of m' is preferably 5 or smaller).

As the organic silicon compound containing fluorine, it is also suitable to use the following compounds.

For example, the compounds include $Rf'(CH_2)_2Si(OCH_3)_3$ (for example, $CF_3$ $(CF_2)_3—CH_2CH_2—Si(CH_3)(OCH_3)_2$, $CF_3$ $(CF_2)_2—CH_2CH_2—Si(CH_3)(OCH_3)_2$, and the like), $Rf'CONH(CH_2)_3Si(OC_2H_5)_3$, $Rf'CONH(CH_2)_2NH(CH_2)_3Si(OC_2H_5)_3$, $Rf'SO_2N(CH_3)(CH_2)_2CONH(CH_2)_3Si(OC_2H_5)_3$, $Rf'(CH_2)_2OCO(CH_2)_2S(CH_2)_3Si(OCH_3)_3$, $Rf'(CH_2)_2OCONH(CH_2)_2Si(OC_2H_5)_3$, $Rf'COO-Cy(OH)—(CH_2)_2Si(OCH_3)_3$, $Rf'(CH_2)_2NH(CH_2)_2Si(OCH_3)_3$, $Rf'(CH_2)_2NH(CH_2)_2NH(CH_2)_2Si(OCH_2CH_2OCH_3)_3$, $CF_3O(CF_2O)_6—CH_2CH_2—Si(OC_2H_5)_3$, $CF_3O(C_3F_6O)_4—CH_2CH_2—Si(OCH_3)_3$, $CF_3O(C_3F_6O)_2(CF_2O)_3—CH_2CH_2—Si(OCH_3)_3$, $CF_3O(C_3F_6O)_5—CH_2CH_2—Si(OCH_3)_3$, $CF_3O(C_4F_5O)_5—CH_2CH_2—Si(OCH_3)_3$, $CF_3O(C_4F_8O)_8—CH_2CH_2—Si(CH_3)(OC_2H_8)_2$, $CF_3O(C_3F_8O)_4—CH_2CH_2—Si(C_2H_8)(OCH_3)_2$. In the formulas described above, Cy is a cyclohexyl residue, and Rf' is the fluoroalkyl group having 4 to 16 carbon atoms.

As the silane coupling agent containing fluorine, a commercially available product may be used. For example, the commercially available product of the silane coupling agent containing fluorine includes TSL8233 (manufactured by GE Toshiba Silicones Co., Ltd.), TSL8257 (manufactured by GE Toshiba Silicones Co., Ltd.), Optool DSX (trademark, manufactured by Daikin Industries, LTD), KY-130 (trademark, manufactured by Shin-Etsu Chemical Co., Ltd.), KP-801 (manufactured by Shin-Etsu Chemical Co., Ltd.), and KY-185 (manufactured by Shin-Etsu Chemical Co., Ltd.).

According to the present embodiment, it is preferable that the coating film 110E contains a polymer (hereinafter, referred to as a polymer of the metal alkoxide containing fluorine") obtained by polymerizing the metal alkoxide containing fluorine, and it is more preferable that the coating film 110E is formed of the polymer of the metal alkoxide containing fluorine.

The polymer may be formed through polymerization reaction (for example, polymerization reaction involving hydrolysis) of the metal alkoxide containing fluorine. That is, the polymer described herein is a concept including the polymer formed so as to be derived from the metal alkoxide containing fluorine. For example, in a case where the polymer is the "polymer of the silicon alkoxide containing the fluorine", if the polymer has a siloxane bond derived from the silicon alkoxide containing the fluorine, the polymer is included in the polymer described herein.

According to the present embodiment, the metal alkoxide containing fluorine contained in the coating film 110E is the polymer of the metal alkoxide containing fluorine. Accordingly, the strength of the coating film 110E is likely to increase. In this manner, the coating film is inhibited from being separated, and the effect of inhibiting the chipping is more evidently achieved.

In the timepiece component according to the present embodiment, it is preferable that an average thickness of the coating film 110E is thin. For example, the average thickness is 20 nm or thinner, and preferably 10 nm or thinner. A lower limit is preferably 1 nm or thicker.

The average thickness of the coating film means a value measured using a reflectance spectrophotometer (FE-3000, manufactured by Ohtsuka Electronics Co., Ltd.). Film thicknesses at any 10 locations of the front surface and the rear surface of the escape wheel are measured so that an average value thereof is obtained as the average thickness of the coating film 110E.

In the timepiece component according to the present embodiment, it is preferably that the silicon oxide layer 110S is formed on the front surface of the substrate. That is, it is preferable that the silicon oxide layer 110S is formed on the front surface of the substrate, and that the coating film 110E is formed on the front surface of the silicon oxide layer 110S.

In this manner, the metal derived from the metal alkoxide is easily coupled with the silicon oxide layer 110S via the oxygen atom. As a result, it becomes easy to form the coating film 110E having high density and excellent adhesion, and the effect of inhibiting the chipping is more evidently achieved.

For example, the thickness of the silicon oxide layer 110S may be in a range of a nano-order to several microns (for example, 3 μm). From a viewpoint of obtaining the coating film 110E having the high density and the excellent adhesion, the thickness is 10 nm or thicker, more preferably 100 nm or thicker, and much more preferably 1,000 nm or thicker. From a viewpoint of manufacturing suitability, the upper limit is preferably 3,000 nm or thinner, and more preferably 2,500 nm or thinner.

In the escape wheel 110 according to the present embodiment, it is preferable that a friction coefficient is smaller as much as possible from a viewpoint of inhibiting the chipping of the silicon-made substrate. Specifically, the friction coefficient is preferably 0.15 or lower, more preferably 0.1 or lower, and much more preferably 0.05 or lower.

The friction coefficient described herein is a value measured by the following method.

First, a flat plate-shaped test specimen (5 cm×5 cm, thickness: 0.625 mm) having the same configuration as that of the escape wheel is prepared. In a state where a ceramic ball (diameter: 4.7625 mm) made of $Al_2O_3$ is pressed on the test specimen with a load of 10 gf ($1.02\times10^{-3}$ N), a resistance value is measured when the test specimen is moved to reciprocate to the right and left 9 times at moving speed of 0.1 mm/sec and with a moving distance of 5 mm. The friction coefficient is calculated from the second to eighth average values of the obtained resistance values. The friction coefficient can be measured using a friction wear testing machine (manufactured by Shinto Scientific Co., Ltd.: HS2000).

Operation

According to the present embodiment, when the axle 120 is inserted into the escape wheel 110, the friction in the contact portions 113A and 114C in contact with the axle 120 can be reduced. In this manner, it is possible to inhibit the chipping in the contact portions 113A and 114C in contact with the axle 120.

The coating film 110E is configured to contain the polymer of the metal alkoxide containing fluorine. Accordingly, compared to a case where the stress relaxation layer is formed of metal such as nickel, the thickness dimension of the coating film 110E can be reduced. The weight of the escape wheel 110 can be reduced, and the inertia force of the escape wheel & pinion 100 can be reduced.

Furthermore, the coating film 110E is formed on the whole surface of the escape wheel 110. Accordingly, the friction on a sliding contact surface in contact with the pallets 144A and 144B of the pallet fork 140 can be reduced. Therefore, the energy transfer efficiency of the escape wheel 110 can be improved.

Therefore, the movement 10 is equipped with the escape wheel 110 according to the present embodiment, thereby improving an oscillation angle of the balance with hairspring 27. In this manner, mobile accuracy of the mechanical timepiece 1 can be improved. If the energy transfer efficiency is improved, torques of the mainspring can be reduced. As a result, the movement 10, that is, the mechanical timepiece 1 can be driven for a longer period of time.

Hereinafter, an example of a manufacturing method of the timepiece component according to the invention will be described.

Manufacturing Method of Timepiece Component

For example, the manufacturing method of the timepiece component (for example, the escape wheel 110) according to the present embodiment has a step of preparing the silicon-made substrate (hereinafter, referred to as a "preparation step"), a step of applying a composition for forming the coating film to the contact portion coming into contact with at least the axle on the front surface of the substrate (hereinafter, referred to as a "composition application step"), and a step of drying the composition for forming the coating film which is applied to the front surface of the substrate (hereinafter, referred to as a "drying step").

Through the above-described steps, the timepiece component according to the present embodiment is obtained. That is, it is possible to obtain the timepiece component which can inhibit the chipping of the silicon-made substrate and which can inhibit a weight increase.

Hereinafter, the composition for forming the coating film may be simply referred to as the "composition".

Preparation Step

In the preparation step, the silicon-made substrate is prepared. The preparation step is an expedient step. That is, the silicon-made substrate (substrate in a state where the coating film is not formed) may be manufactured, or may be procured. The silicon-made substrate is more excellent in processing accuracy and lighter, compared to the metal-made substrate.

Composition Application Step

In the composition application step, the composition for forming the coating film is applied to the contact portion coming into contact with at least the axle on the front surface of the substrate.

The composition can be prepared by providing at least the metal alkoxide containing fluorine with a solvent and mixing both of these.

The metal alkoxide containing fluorine is synonymous with the above-described metal alkoxide containing fluorine, and the preferred ranges are the same as each other. The metal alkoxide containing fluorine may be used alone, or may be used in combination of two or more types.

From a viewpoint of obtaining a homogeneous coating film, in terms of solid content, the content of the metal alkoxide containing fluorine in the composition is preferably 0.01% by mass to 0.50% by mass with respect to the total mass of the composition, more preferably 0.05% by mass to 0.20% by mass, and much more preferably 0.07% by mass to 0.10% by mass.

For example, although not particularly limited, the solvent includes alcohols such as methyl alcohol, ethyl alcohol, n-propyl alcohol, and n-butanol; ketones such as acetone and methyl ethyl ketone; ethers such as tetrahydrofuran and dioxane; nitriles such as acetonitrile; esters such as ethyl acetate and n-propyl acetate; and solvents in which the fluorine atom is contained (fluorine-based solvent) in these solvents. Among these materials, from a viewpoint of improving solubility of the metal alkoxide containing fluorine, it is preferable to use the fluorine-based solvents.

For example, the method of applying the composition includes known application methods such as dipping, spraying, spin coating, and roll coating methods. Among these methods, from a viewpoint of obtaining the homogeneous coating film, it is preferable to employ the dipping method.

The composition may be applied once, or may be applied multiple times. However, it is preferable that the composition is applied once.

For example, in a case where the method of applying the composition is the dipping method, it is preferable that the contact portion coming into contact with at least the axle is dipped once into the composition. It is preferable that a time for the dipping once is 30 seconds or longer.

From a viewpoint of adjusting the thickness of the coating film, it is preferable that the speed (lifting speed) when lifting the above-described contact portion dipped into the composition is 2 mm/sec to 100 mm/sec.

In this manner, it becomes easy to obtain the coating film having a desired thickness (preferably 10 nm or thinner).

The composition may contain components other than the metal alkoxide containing fluorine and the solvent. For example, the other components include polymerization initiators and catalysts.

Drying Step

In the drying step, composition applied to the front surface of the substrate is dried.

Although not particularly limited, for example, the drying method includes heat drying, reduced-pressure drying, and natural drying. Among these methods, it is preferable to employ the heat drying method.

For example, in a case where the drying method is the heat drying, the heating temperature is preferably 50° C. to 200° C., more preferably 70° C. to 150° C., and much more preferably 100° C. to 120° C.

If the heating temperature is 50° C. or higher, the polymerization reaction of the metal alkoxide containing fluorine in the composition is likely to be promoted.

If the heating temperature is 200° C. or lower, it becomes easy to inhibit the obtained coating film from being separated.

Thus, if the heating temperature is 50° C. to 200° C., it becomes easy to form the coating film containing the polymer of the metal alkoxide (preferably, the coating film formed of the polymer of the metal alkoxide).

Step of Forming Silicon Oxide Layer ($SiO_2$ Layer Forming Step)

In the manufacturing method of the timepiece component according to the present embodiment, before the composition application step is performed, it is preferable to perform the step of forming the silicon oxide layer 110S on the front surface of the substrate (hereinafter, referred to as a "$SiO_2$ layer forming step"). That is, it is preferable that the manufacturing method of the timepiece component according to the present embodiment has the preparation process, the $SiO_2$ layer forming process, the composition application process, and the drying process in this order.

In this manner, the metal derived from the metal alkoxide is likely to be coupled with the silicon oxide layer 110S via an oxygen atom. As a result, it becomes easy to form the coating film having the high density and the excellent adhesion.

The method of forming the $SiO_2$ layer is not particularly limited. For example, the method includes a thermal oxidation method, a CVD method (plasma CVD method), a PVD method (sputtering method), and a wet oxidation method. Among these methods, it is preferable to employ the thermal oxidation method using water vapor.

In a case where the $SiO_2$ layer forming method is the thermal oxidation method using the water vapor, for example, the substrate is loaded into a thermal oxidation furnace and is held for a predetermined time in a water vapor atmosphere containing oxygen. In this manner, the $SiO_2$ layer can be formed on the front surface of the substrate.

In this case, the temperature of the thermal oxidation treatment (that is, the temperature of the thermal oxidation furnace) is preferably 800° C. to 1,300° C., more preferably 900° C. to 1,200° C., and much more preferably 1,000° C. to 1,100° C.

The thermal oxidation temperature is set to fall within the above-described range, and the time is appropriately adjusted. In this manner, it becomes easy to obtain the $SiO_2$ layer having a desired thickness.

Step of Treating Front Surface (Front Surface Treatment Step)

In the manufacturing method of the timepiece component according to the present embodiment, before the composition application step is performed, it is preferable to perform a step of treating the front surface of the substrate (hereinafter, referred to as a “front surface treatment step”). That is, it is preferable that the manufacturing method of the timepiece component according to the present embodiment has the preparation step, the front surface treatment step, the composition application step, and the drying step in this order. Alternatively, it is preferable that the manufacturing method has the preparation step, the front surface treatment step, the $SiO_2$ layer forming step, the composition application step, and the drying step in this order.

The front surface treatment method is not particularly limited, and for example, includes plasma treatment, ozone treatment, or ultraviolet radiation treatment. Through the front surface treatment, the O—H group is likely to be formed on a base material (the silicon oxide layer 110S in a case where the silicon oxide layer 110S is present), and the adhesion to the formed coating film can be improved. As a result, it becomes easy to form the coating film having the high density and the excellent adhesion on the base material (the silicon oxide layer 110S in a case where the silicon oxide layer 110S is present).

Among these, it is preferable to use the plasma treatment as the front surface treatment method.

In a case where the front surface treatment method is the plasma treatment, the plasma treatment may be performed at atmospheric pressure or under reduced pressure. Gas used for the plasma treatment is not particularly limited, and for example, as the gas, it is possible to use oxygen, nitrogen, argon, or mixtures thereof. Among these, it is preferable to use oxygen-containing gas. Plasma discharge may be DC discharge or AC discharge.

It is preferable to set plasma treatment conditions as follows. For example, the pressure during the plasma treatment is 1 Pa to 1,000 Pa, a power frequency is 50 kHz to 50 MHz, power is 100 W to 1,000 W, a treatment time is 1 minute to 30 minutes, and substrate temperature during the treatment is 25° C. to 250° C.

Through the above-described steps, the timepiece component according to the present embodiment can be obtained.

The manufacturing method of the timepiece component according to the present embodiment may have another step in addition to the above-described steps.

Second Embodiment

A mechanical timepiece according to a second embodiment will be described. The same reference numerals will be given to configurations the same as those according to the above-described first embodiment, and description thereof will be omitted.

Figure 9:
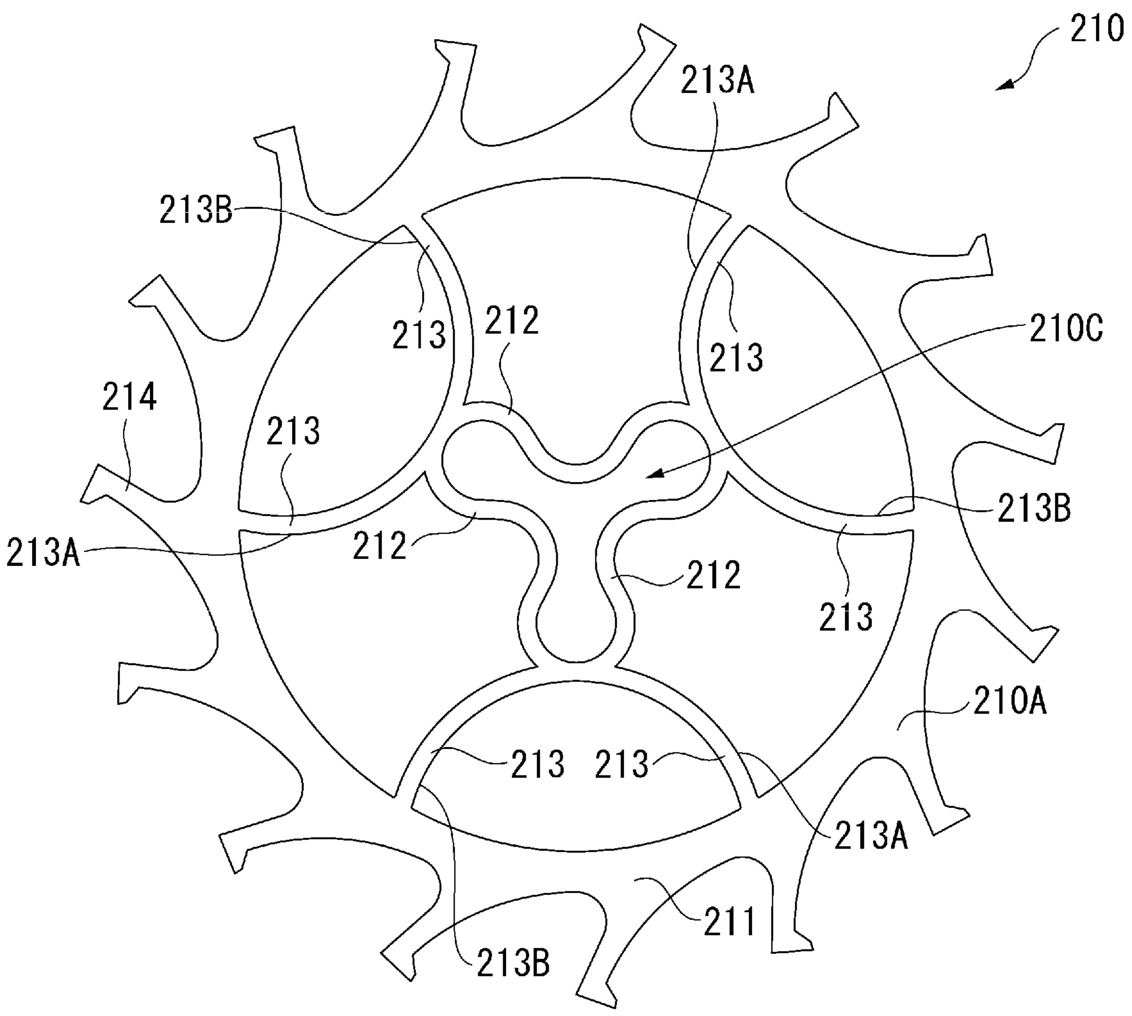
FIG. 9 is a plan view of an escape wheel serving as a timepiece component according to a second embodiment of the invention.

The mechanical timepiece of the second embodiment has configurations the same as those of the mechanical timepiece 1 according to the first embodiment except that an escape wheel 210 illustrated in FIG. 9 is used as the timepiece component.

FIG. 9 is a plan view of an escape wheel 210 serving as the timepiece component according to the second embodiment of the invention.

The escape wheel 210 has a silicon-made substrate having an insertion portion 210C into which the axle is inserted and a coating film (not illustrated) formed in the contact portion coming into contact with at least the axle, on the front surface of the substrate.

The escape wheel 210 is configured so that a front surface 210A serving as one surface and a rear surface serving as a surface opposite to one surface are flat surfaces, and is formed in a plate shape having the uniform thickness over the whole surface. The escape wheel 210 has a projection portion 212, an elastic portion 213, opening portions 213A and 213B, and a rim 211.

A plurality of the projection portions 212 are located in the central portion of the escape wheel 210, and are formed to project while being curved inward and toward the insertion portion 210C. According to the second embodiment, the escape wheel 210 has three projection portions 212.

The elastic portion 213 connects the projection portion 212 and the rim 211 to each other, and a plurality of the elastic portions 213 are formed in a spoke shape. Each of the elastic portions 213 extends radially in an arc shape divided into two from the adjacent projection portions 212 toward the inner peripheral edge of the rim 211. The opening portion 213A is a through-hole formed so as to be surrounded with the projection portion 212, the elastic portion 213, and the rim 111. The opening portion 213B is a through-hole formed so as to be surrounded with the elastic portion 213 and the rim 211.

The elastic portion 213 is located between the projection portion 212 and the rim 211. Accordingly, the elasticity of the elastic portion 213 relaxes the stress applied to the projection portion 212, thereby enabling the projection portion 212 to obtain a proper holding force for holding the axle.

The rim 211 is located around the escape wheel 210. The outer peripheral surface of the rim 211 has a plurality of teeth 214 formed in a special hook shape which protrudes outward in the radial direction. A plurality of the teeth 214 of the escape wheel 210 mesh with the pallet fork 140 (refer to FIG. 3).

The insertion portion 210C is a through-hole formed so as to be surrounded with a plurality of the projection portions 212. The axle is inserted into the insertion portion 210C, and is located so as to come into contact with an inner top portion of the three projection portions 212. The axle is fixed to the central portion of the escape wheel 210 by using the fixing ring 130 according to the first embodiment, for example.

The escape wheel 210 according to the second embodiment may configure the escape wheel by inserting the axle 120 according to the first embodiment into the insertion portion 210C, or may configure the escape wheel by inserting the axle appropriately designed to match a shape of the escape wheel 210 into the insertion portion 210C. As a fixing member (fixing ring) for fixing the axle, those which are appropriately designed can be used.

Operation

An advantageous effect which is the same as that according to the first embodiment can be obtained.

That is, according to the escape wheel 210 in the second embodiment, when the axle 120 is inserted into the escape wheel 210, it is possible to inhibit the chipping in the contact portion (projection portion 212) in contact with the axle 120. The coating film is formed on the overall escape wheel 210. Accordingly, the friction on the sliding contact surface in contact with the pallet fork 140 can be reduced, and the energy transfer efficiency of the escape wheel 210 can be improved. Furthermore, the movement 10 is equipped with the escape wheel 210, thereby improving the oscillation angle of the balance with hairspring 27. In this manner, the mobile accuracy can be improved and torques of the mainspring can be reduced. As a result, the movement 10, that is, the mechanical timepiece 1 can be driven for a longer period of time.

OTHER EMBODIMENTS

Without being limited to the configurations of the first embodiment and the second embodiment, the invention can be modified in various ways within the scope of the invention.

In the above-described embodiments, the escape wheels 110 and 210 have been described as an example of the timepiece component. However, the timepiece component is not limited thereto. For example, the timepiece component according to the above-described embodiments is applicable to components configuring a movement barrel, a center wheel & pinion, a third wheel & pinion, a second wheel & pinion, the pallet fork 140, or the balance with hairspring 27. The movement 10 or the timepiece may be equipped with one type alone of these timepiece components or in combination of two or more types.

In the above-described embodiments, a case has been described where the coating film is formed on the whole surface of the substrate (substrate in a state where the coating film is not formed). However, the coating film may be formed in the contact portion in contact with at least the axle.

The timepiece component according to the invention may be used by applying oil to a loaded location of the timepiece component, such as a contact portion or a sliding portion with other components.

APPLICATION EXAMPLES

Hereinafter, the invention will be described in more detail with reference to application examples. The materials, amounts in use, proportions, processing contents, or processing procedures described in the following application examples can be appropriately modified within the scope not departing from the gist of the invention. Therefore, the scope of the invention is not limited to the specific examples described below.

Application Example 1

A silicon-made substrate (5 cm×5 cm, thickness 0.625 mm) is prepared.

Subsequently, this substrate is loaded into a thermal oxidation furnace and is held in an oxygen atmosphere at temperature of 1,050° C. for 11 hours so as to form a silicon oxide ($SiO_2$) layer 110S serving as a thermal oxide film on the front surface of the substrate. Thereafter, the substrate having the $SiO_2$ layer 110S formed thereon is loaded into a plasma apparatus. The substrate is subjected to plasma treatment under conditions such as an oxygen flow rate of 500 ml/min, pressure of 100 Pa, power of 500 W, and a treatment time of 10 minutes.

Subsequently, the organic silicon compound containing fluorine (manufactured by Shin-Etsu Chemical Co., Ltd.: KY185 (solid content concentration: 20% by mass)) is dissolved using a fluorine-based solvent (manufactured by 3M Company: Novec7200) so that the solid content concentration reaches 0.1% by mass. In this manner, a composition for forming the coating film (hereinafter, referred to as a “composition A”) is prepared.

Subsequently, the substrate subjected to the plasma treatment is dipped into the composition A for 30 seconds. Thereafter, the substrate is lifted from the composition A at speed of 10 mm/sec. The lifted substrate is loaded into an oven, and is held at temperature of 120° C. for 10 minutes in an atmosphere so as to dry the substrate. In this manner, the substrate is obtained in which the coating film containing the organic silicon compound containing fluorine is formed on the whole front surface of the substrate. This substrate is used as a test specimen of the escape wheel.

Application Example 2

A test specimen for Application Example 2 is obtained in the same manner as that for Application Example 1 except that oil (manufactured by Citizen watch Co., Ltd.: CTZ-AO-P3) is applied to the front surface of the test specimen for Application Example 1.

Comparative Example 1

A silicon-made substrate (5 cm×5 cm, thickness 0.625 mm) similar to that according to Application Example 1 is prepared so as to be used as a test specimen for Comparative Example 1.

Comparative Example 2

The oil (manufactured by Citizen Watch Co., Ltd.: CTZ-AO-P3) is applied to the front surface of the test specimen for Comparative Example 1 so as to be used as a test specimen for Comparative Example 2.

Evaluation

Friction Test

A friction coefficient is measured through the above-described method using each test specimen for Application Example 1 to Application Example 2 and Comparative Example 1 to Comparative Example 2.

Figure 10:
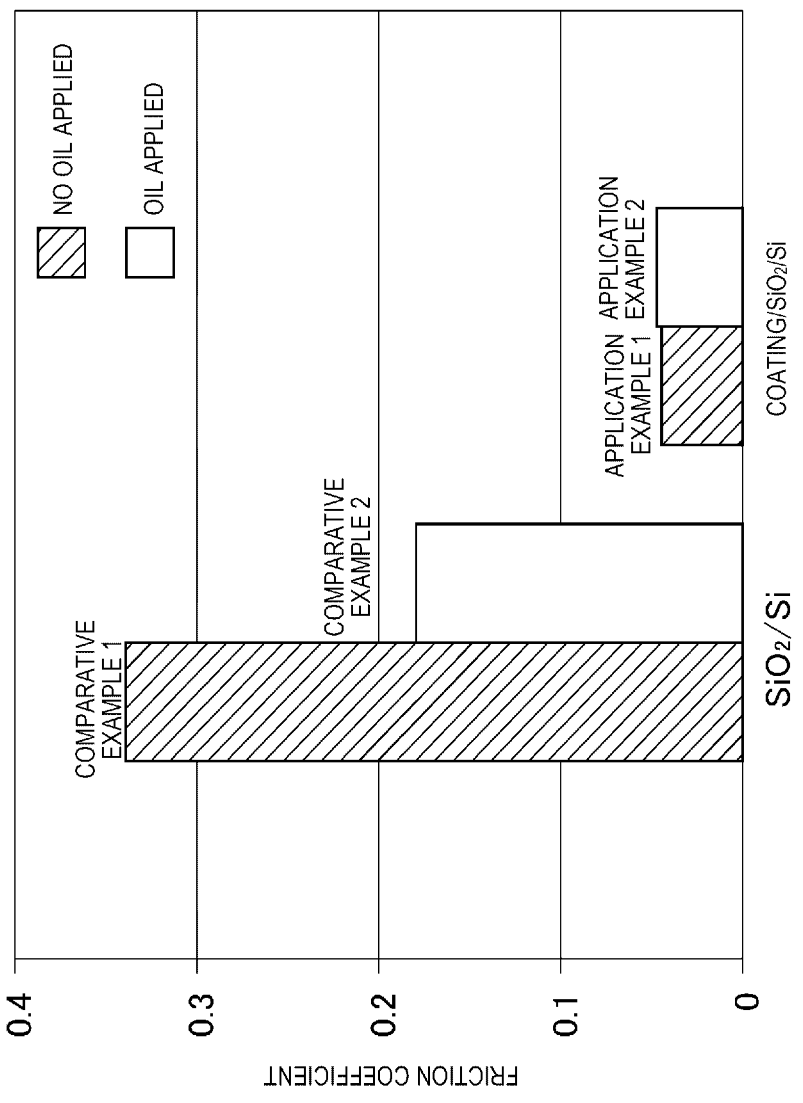
FIG. 10 is a graph illustrating a friction coefficient in a test specimen according to an application example and a comparative example.

The results are illustrated in FIG. 10. FIG. 10 is a graph illustrating the friction coefficient in each test specimen for the application examples and the comparative examples.

As illustrated in FIG. 10, compared to Comparative Example 1 to Comparative Example 2, it is understood that the friction coefficient decreases in Application Example 1 to Application Example 2. In particular, according to Application Example 1, no oil is applied to the front surface. However, it is understood that the friction coefficient decreases compared to Comparative Example 2 in which the oil is applied to the front surface.

Based on the above-described results, by using the escape wheel, in which the coating film containing the metal alkoxide containing fluorine is formed on the front surface of the silicon-made substrate, when the axle is inserted into the insertion portion of the escape wheel, the friction is reduced in the contact portion. As a result, it is considered that the chipping in the contact portion is inhibited.

In each test specimen for Application Example 1 to Application Example 2, the “coating film containing organic silicon compound containing fluorine (an example of the metal alkoxide containing fluorine) is formed on the front surface. Accordingly, for example, compared to the test specimen in which the “coating film containing metal such as nickel” is formed on the front surface, the weight is further reduced. Therefore, it is conceivable that the inertia force of the escape wheel can be reduced by using the escape wheel in which the coating film containing the metal alkoxide containing fluorine is formed on the front surface of the silicon-made substrate.

The entire disclosure of Japanese Patent Application No. 2017-177064, filed Sep. 14, 2017 is expressly incorporated by reference herein.

What is claimed is:

1. A timepiece comprising:

a timepiece movement including:

an axle;

a timepiece component formed of a silicon-made substrate having an insertion portion into which the axle is inserted;

a coating film disposed on a surface of the silicon-made substrate that defines a contact portion of the timepiece component that comes into contact with at least the axle; and an indicating hand driven by the timepiece movement, wherein the coating film contains a metal alkoxide having a fluorine atom, and a metal of the metal alkoxide is selected from the group consisting of titanium, aluminum, and zirconium, and wherein the metal alkoxide of the coating film contains a long-chain polymer group that contains 9 to 24 carbon atoms.

2. The timepiece according to claim 1, wherein the long chain polymer group is at least any one type of a fluoroalkyl group, a perfluoroalkyl group, and a perfluoroalkylene ether group.

3. The timepiece according to claim 1, wherein a silicon oxide layer is disposed on the surface of the silicon-made substrate that defines the contact portion, and wherein the coating film is disposed on the silicon oxide layer.

4. The timepiece according to claim 1, wherein the timepiece component is an escape wheel.

5. The timepiece according to claim 4, wherein the escape wheel includes a rim having a plurality of teeth, a first holder extending in a direction from the rim toward the axle, and a second holder having a first portion extending in a direction intersecting the first holder, and a second portion connected to the first portion and extending in a direction from the first portion toward the axle.

* * * * *